United States Patent
Kim et al.

(10) Patent No.: US 9,791,726 B2
(45) Date of Patent: Oct. 17, 2017

(54) 3-DIMENSIONAL IMAGE DISPLAY DEVICE INCLUDING A PATTERNED RETARDER

(71) Applicant: LG DISPLAY CO., LTD., Seoul (KR)

(72) Inventors: Kwan Son Kim, Paju-si (KR); Joo Hong Lee, Seoul (KR); Woong Ki Min, Paju-si (KR); Yoonsan Park, Goyang-si (KR)

(73) Assignee: LG DISPLAY CO., LTD., Soeul (KR)

( * ) Notice: Subject to any disclaimer, the term of this patent is extended or adjusted under 35 U.S.C. 154(b) by 87 days.

(21) Appl. No.: 14/552,874

(22) Filed: Nov. 25, 2014

(65) Prior Publication Data
US 2015/0146141 A1    May 28, 2015

(30) Foreign Application Priority Data

Nov. 26, 2013 (KR) .................. 10-2013-0144596

(51) Int. Cl.
*G02F 1/133* (2006.01)
*G02B 27/26* (2006.01)
*G09G 3/00* (2006.01)
*G09G 3/36* (2006.01)
*G09G 5/42* (2006.01)

(52) U.S. Cl.
CPC ......... *G02F 1/13306* (2013.01); *G02B 27/26* (2013.01); *G09G 3/003* (2013.01); *G09G 3/3648* (2013.01); *G09G 2320/0209* (2013.01)

(58) Field of Classification Search
CPC combination set(s) only.
See application file for complete search history.

(56) References Cited

U.S. PATENT DOCUMENTS

| | | | |
|---|---|---|---|
| 2003/0137626 A1* | 7/2003 | Khazova | G02F 1/1335 349/117 |
| 2011/0122128 A1 | 5/2011 | Akita | |
| 2011/0122239 A1* | 5/2011 | Baik | G09G 3/003 348/58 |
| 2012/0013610 A1* | 1/2012 | Chae | G02B 27/22 345/419 |
| 2012/0169949 A1 | 7/2012 | Son | |

(Continued)

FOREIGN PATENT DOCUMENTS

| CN | 102313998 A | 1/2012 |
|---|---|---|
| CN | 102340683 A | 2/2012 |

(Continued)

*Primary Examiner* — Lauren Nguyen
(74) *Attorney, Agent, or Firm* — Dentons US LLP

(57) ABSTRACT

A stereoscopic three-dimensional image display device is disclosed which includes: a liquid crystal display panel defined into a plurality of pixel regions; a data driver to supply data voltages to the pixel regions; a patterned retarder disposed on a front surface of the liquid crystal display panel to polarize light from the liquid crystal display panel. The patterned retarder includes a first patterned retarder, to circularly polarize light from the liquid crystal display panel in a first direction and formed in a height greater than that of a pixel region of the plurality of pixel regions, and second patterned retarder to circularly polarize light from the liquid crystal display panel in a second direction opposite the first direction and formed in a height greater than that of the pixel region.

3 Claims, 5 Drawing Sheets

(56) References Cited

U.S. PATENT DOCUMENTS

| | | | |
|---|---|---|---|
| 2013/0063327 A1* | 3/2013 | Nakahata | ............... G02B 27/26 345/32 |
| 2013/0278652 A1 | 10/2013 | Nakahata | |
| 2013/0321247 A1 | 12/2013 | Ajichi | |

FOREIGN PATENT DOCUMENTS

| | | | | |
|---|---|---|---|---|
| CN | 102572473 A | | 7/2012 | |
| EP | 2227026 A1 | | 9/2010 | |
| EP | 2551842 A1 | | 1/2013 | |
| WO | 2012/111496 A1 | | 8/2012 | |
| WO | WO-2012-127945 | * | 9/2012 | .......................... 3/36 |

* cited by examiner

3-DIMENSIONAL IMAGE DISPLAY DEVICE INCLUDING A PATTERNED RETARDER

The present application claims priority under 35 U.S.C. §119(a) to Korean Patent Application No. 10-2013-0144596 filed on Nov. 26, 2013, which is hereby incorporated by reference in its entirety for all purposes as if fully set forth herein.

BACKGROUND

Field of the Disclosure

The present application relates to a three-dimensional (3-D) image display device.

Description of the Related Art

A 3-D image display device is classified into a stereoscopic 3-D display device and an auto-stereoscopic 3-D display device.

The stereoscopic 3-D display device realizes a large 3-D visual effect using left and right parallax images. Such a stereoscopic 3-D display device is classified into a glasses-type stereoscopic display device and a glasses-free stereoscopic 3-D display device. The glasses-type stereoscopic 3-D display device displays left and right parallax images on one of a liquid crystal display panel and a projector with switching polarization directions in a time division system, and enables users to each wear polarizing glasses or liquid crystal shutter glasses, in order to visualize a 3-D image. The glasses-free stereoscopic 3-D display device generally includes an optical plate, a parallax barrier or others, which is installed onto the surface or at the front side of a liquid crystal display panel, and used to separate light axis of left and right parallax images from each other.

Recently, with commercialization and technical development of the 3-D image display device, a patterned retarder corresponding to an optical film, with optical modulation characteristics varying along patterns, is being often applied to the 3-D image display device.

FIG. 1 is a schematic diagram showing the configuration of a 3-D image display device according to the related art.

Referring to FIG. 1, a 3-D image display device of the related art includes a liquid crystal display panel 1, a polarizing plate 3, and a patterned retarder 5.

The liquid crystal display panel 1 includes a plurality of pixels which is arranged in a matrix shape configured with columns and rows. The polarizing plate 3 is attached to the front surface of the liquid crystal display panel 1. This polarizing plate 3 is used to polarize light applied from a backlight unit (not shown) through the liquid crystal display panel 1 into a fixed direction.

The patterned retarder 5 is attached onto the front surface of the polarizing plate 3. Also, the patterned retarder 5 includes first patterned retarders 5a and second patterned retarders 5b. The first patterned retarders 5a are arranged to correspond to odd-numbered row pixels of the liquid crystal display panel 1, and the second patterned retarders 5b are arranged to correspond to even-numbered row pixels of the liquid crystal display panel 1. Also, the first patterned retarder circularly polarizes light passing through the odd-numbered row pixels of the liquid crystal display panel 1 in one direction, and the second patterned retarder 5b circularly polarizes light passing through the even-numbered row pixels in an opposite direction. The left-circularly polarized light and the right-circularly polarized light by the patterned retarder 5 are transferred to polarizing glasses 7 worn by a user.

The polarizing glasses 7 are used to separate an image into a left eye image and a right eye image.

Such polarizing glasses 7 include a left side glass 7a and a right side glass 7b. For example, the left side glass 7a transmits the image which is displayed on the odd-numbered row pixels and circularly polarized by the first patterned retarders 5a. According to this example, the right side glass 7b transmits the image which is displayed on the even-numbered row pixels and circularly polarized by the second patterned retarder 5b.

In other words, different images are transmitted on the left side glass 7a and the right side glass 7b. As such, the user can view a 3-D image.

FIG. 2 is a side view showing a liquid crystal display panel and a patterned retarder according to the related art.

As shown in FIG. 2, the related art liquid crystal display panel 1 is defined into left eye regions L, right eye regions R, and black matrix regions B.

The left eye regions L can be arranged opposite to the first patterned retarders 5a, and the right eye regions R can be arranged opposite to the second patterned retarders 5b. The first patterned retarder 5a circularly polarizes light passing through the left eye region L, and the second patterned retarder 5b circularly polarizes light passing through the right eye region R.

The black matrix regions B do not transmit light and can be formed between the left eye regions L and the right eye regions R of the liquid crystal display panel 1. As the areas of the left eye region L and the right eye region R are reduced, the areas of the black matrix regions B are increased. Also, a viewing angle of the 3-D image display device being defined as a sum of a first viewing angle $\theta_1$ and a second viewing angle $\theta_2$ can increase.

As illustrated in FIG. 2, the first viewing angle $\theta_1$ (for example, a downward viewing angle) is defined as an angle between a perpendicular line to the liquid crystal display panel 1 and the patterned retarder 5 and a diagonal line connecting one end of the left eye region L and one end of the first patterned retarder 5a. Similarly, the second viewing angle $\theta_2$ (for example, an upward viewing angle) can be defined as another angle between the above-mentioned perpendicular line and another diagonal line connecting the other end of the left eye region L and the other end of the first patterned retarder 5a.

However, the black matrix regions B included in the liquid crystal display panel 1 take up space and reduce an aperture ratio of the pixel. Due to this, less light is transmitted and brightness of the liquid crystal display panel 1 decreases.

Moreover, the left and right eye regions L and R and the first and second patterned retarders 5a and 5b are formed to each have a small pitch (or a small vertical height). Thus, misalignment of the liquid crystal display panel 1 and the patterned retarder 5 can cause an imaging problem. If misalignment occurs, the first viewing angle and the second viewing angle must be different from each other resulting in a viewing problem.

BRIEF SUMMARY

Accordingly, embodiments of the present application are directed to a 3-D image display device that substantially obviates one or more of problems due to the limitations and disadvantages of the related art.

The embodiments relate to provide a 3-D image display device which is adapted to enhance upward and downward viewing angles.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

To achieve these and other advantages of the disclosure and according to one general aspect of the embodiments, a 3-D image display device includes: a liquid crystal display panel having a plurality of pixel regions; a data driver configured to supply data voltages to the pixel regions; a patterned retarder disposed on a front surface of the liquid crystal display panel to polarize light from the liquid crystal display panel. The patterned retarder includes a first patterned retarder, configured to circularly polarize light from the liquid crystal display panel in a first direction and is formed in a height greater than that of a pixel region of the plurality of pixel regions, and a second patterned retarder to circularly polarize light from the liquid crystal display panel in a second direction opposite the first direction and is formed in a height greater than that of the pixel region.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
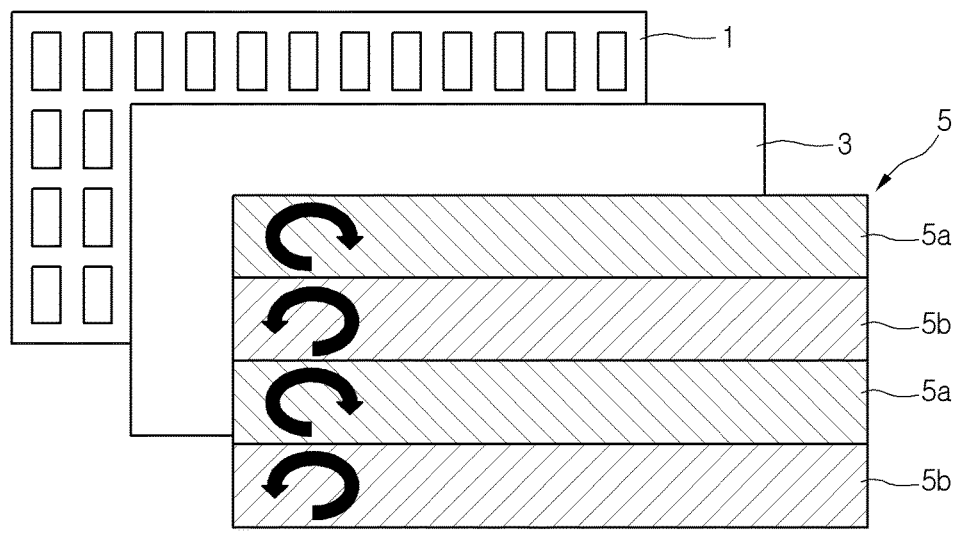
FIG. 1 is a schematic diagram showing the configuration of a 3-D image display device according to the related art.
Figure 1:
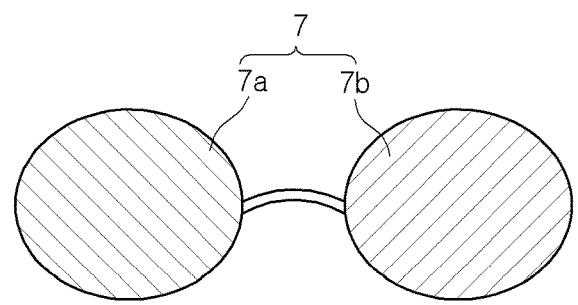
Figure 1:
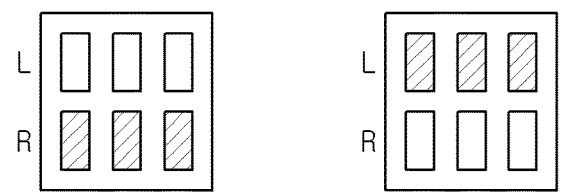
Figure 2:
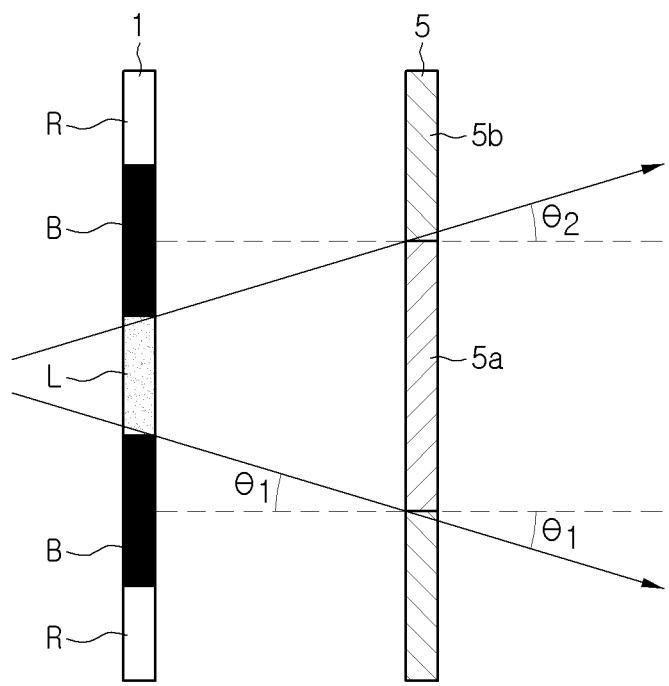
FIG. 2 is a side view showing a liquid crystal display panel and a patterned retarder according to the related art.

Reference will now be made in detail to embodiments of the present disclosure, examples of which are illustrated in the accompanying drawings. These embodiments introduced hereinafter are provided as examples in order to convey the spirit of the invention to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

A 3-D image display device according to an exemplary embodiment includes: a liquid crystal display panel defined into a plurality of pixel regions; a data driver configured to apply data voltages to the pixel regions; a patterned retarder disposed on a front surface of the liquid crystal display panel and configured to polarize light from the liquid crystal display panel. The patterned retarder includes a first patterned retarder, which is configured to left-circularly polarize light from the liquid crystal display panel and is formed in a larger width than that of the pixel region, and second patterned retarder which is configured to right-circularly polarize light from the liquid crystal display panel and is formed in a larger width than that of the pixel region.

The data driver can supply the liquid crystal display panel with the data voltages corresponding to left image data, right image data, and black data.

The black data can be inserted between the left image data and the right image data.

The first and second patterned retarders can be formed to have a double width compared to the pixel region.

The first and second patterned retarders can be formed to have a triple width compared to the pixel region.

A boundary between the first and second patterned retarders can be opposite to the pixel region receiving the black data.

The left image data and the right image data can be applied alternately to the pixel regions on odd-numbered rows, and the black data can be applied to the pixel regions on even-numbered rows.

A boundary between the first and second patterned retarders can be opposite to the pixel region on the even-numbered row.

The left image data and the right image data can be each applied during two consecutive horizontal synchronous intervals, and the black data can be applied between the left image data and the right image data.

The black data is applied during a single horizontal synchronous interval.

Figure 3:
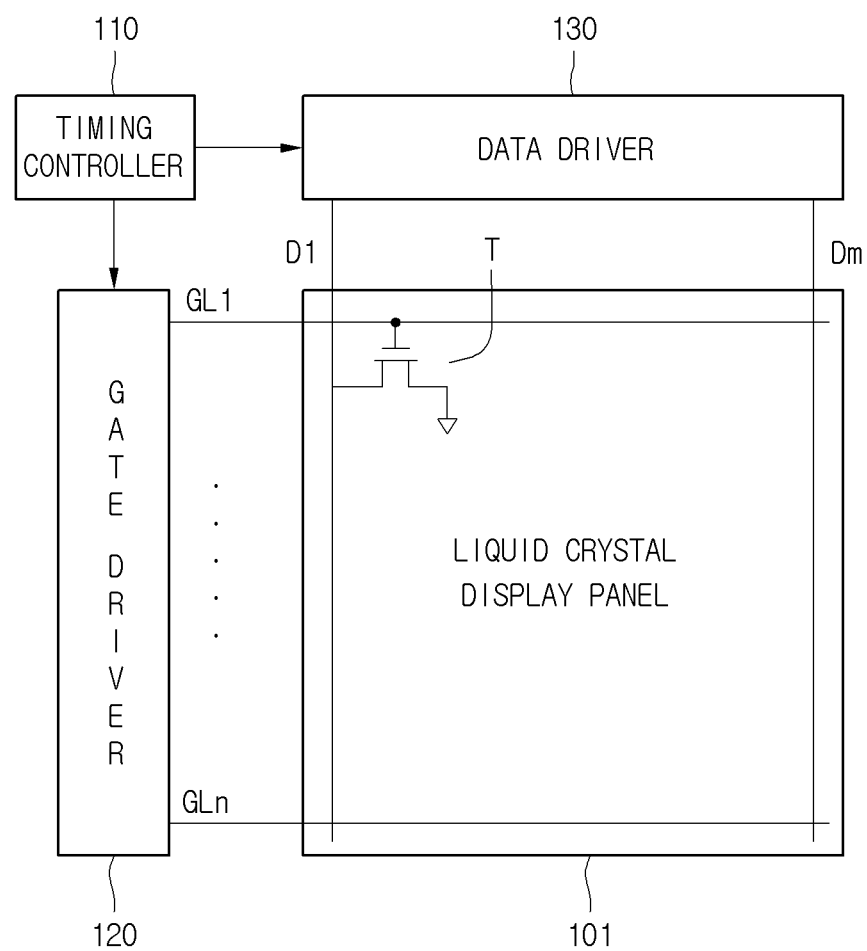
FIG. 3 is a block diagram showing a 3-D image display device according to a first exemplary embodiment of the present disclosure.

FIG. 3 is a block diagram showing a 3-D image display device according to a first embodiment of the present disclosure.

Referring to FIG. 3, a 3-D image display device according to a first exemplary embodiment of the present disclosure can include a liquid crystal display panel 101, a timing controller 110, a gate driver 120, and a data driver 130.

The liquid crystal display panel 101 can include a plurality of gate lines GL1~GLn, and a plurality of data lines DL1~DLm formed in a direction crossing the gate lines GL1~GLn. Also, the liquid crystal display panel 101 can be defined into a plurality of pixel regions by the pluralities of gate lines GL1~GLn and data lines DL1~DLm crossing each other. The liquid crystal display panel 101 can further include a thin film transistor T formed in each of the plural pixel regions. The thin film transistor T can be electrically connected to one of the gate lines GL1~GLn and one of the data lines DL1~DLm. The liquid crystal display panel 101 can also include red, green, and blue (R, G, B) color filters (not shown).

The thin film transistor T is turned-on by a gate signal applied from one of the gate lines GL1~GLn. The turned-on thin film transistor T transfers a data voltage on one of the data lines DL1~DLm to a respective pixel electrode. Then, an electric field is generated by a difference between the data voltage on the pixel electrode and a common voltage on a common electrode (not shown). As such, liquid crystal molecules of a liquid crystal layer (not shown) are realigned by the electric field and control brightness of light applied from a backlight unit (not shown). In accordance therewith, an image can be displayed on the liquid crystal display panel 101.

The timing controller 110 derives gate control signals GDC and data control signals DDC from a horizontal synchronous signal Hsync, a vertical synchronous signal Vsync, and a clock signal CLK which are applied from an external display system. The gate control signals GDC are used to control the gate driver 120, and the data control signals DDC are used to control the data driver 130. Also, the timing controller 110 modifies video data RGB supplied from the display system and supplies the modified video data R'G'B' to the data driver 130. The modification of the video data RGB will be described later.

The gate driver 120 can be configured, for example, with a shift register, a level shifter, an output buffer, and so on. The shift register sequentially generates scan pulses in response to the gate control signals GDC from the timing controller 110. The level shifter is used to enlarge a swing width of the scan pulse to another swing width suitable to drive a liquid crystal cell. The output buffer is used to buffer the level-shifted scan pulse and output the buffered scan pulse as the gate signal. Such a gate driver 120 sequentially applies the gate signals to the gate lines GL1~GLn and turns-on the thin film transistors T connected to the gate lines GL1~GLn, thereby sequentially selecting the liquid crystal cells by a single horizontal line of liquid crystal cells. As such, the data voltages generated in the data driver 130 are applied to a single horizontal line of liquid crystal cells selected by the gate signal.

The data driver 130 samples the modified video data R'G'B' supplied from the timing controller 110, latches the sampled video data R'G'B', and converts the latched video data R'G'B' into analog data voltages. The gate driver 120 and the data driver 130 can be each implemented by at least one integrated circuit (IC) chip.

Figure 4:
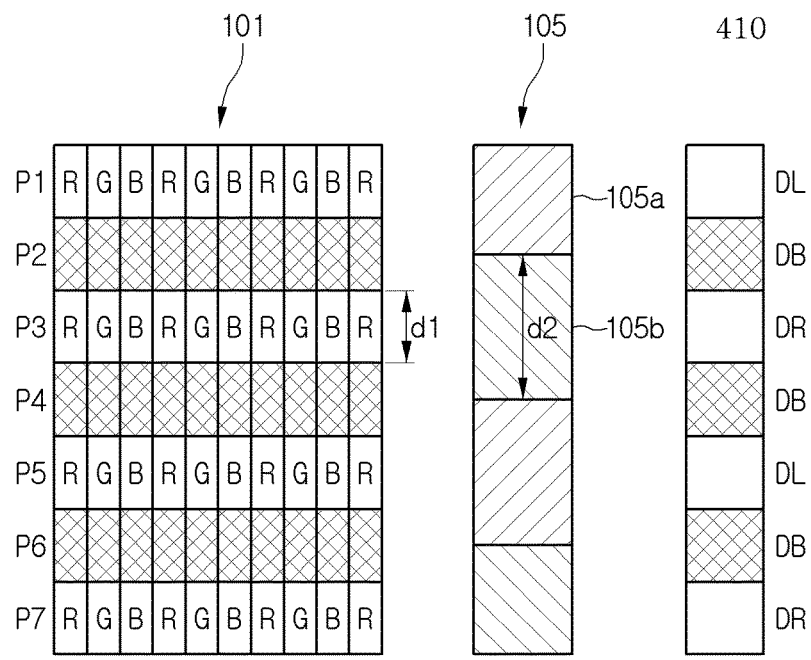
FIG. 4 is a block diagram illustrating the 3-D image display device according to a first exemplary embodiment of the present disclosure.
Figure 5:
FIG. 5 is a waveform diagram illustrating data applied to a liquid crystal display panel of the 3-D image display device according to a first exemplary embodiment of the present disclosure.

FIG. 4 is a block diagram illustrating a liquid crystal display panel of the 3-D image display device according to a first exemplary embodiment of the present disclosure. FIG. 5 is a waveform diagram illustrating data applied to a liquid crystal display panel of the 3-D image display device according to a first exemplary embodiment of the present disclosure.

Referring to FIGS. 4 and 5, the liquid crystal display panel 101 of the first exemplary embodiment can be defined into a plurality of pixel regions.

The plurality of pixel regions can be arranged in a matrix shape with columns and rows. The plural pixel regions can each have a first vertical height d1.

The patterned retarder 105 is disposed onto the front surface of the liquid crystal display panel 101. Such a patterned retarder 105 can include first patterned retarders 105a and second patterned retarders 105b.

The first patterned retarder 105a can circularly polarize light input from the liquid crystal display panel 101 in one direction, and the second patterned retarder 105b can circularly polarize light applied from the liquid crystal display panel 101 in an opposite direction. The first patterned retarders 105a and the second patterned retarder 105b can be arranged alternately with each other.

The first patterned retarder 105a and the second patterned retarder 105b can each have a second vertical height d2. The second vertical height d2 can be two times as big as the first vertical height d1. In other words, the first and second patterned retarders 105a and 105b can be each formed to have a larger vertical height than that of the pixel regions. For example, the first and second patterned retarders 105a and 105b can be each formed to have about a double vertical height compared to that of the pixel region.

The first patterned retarders 105a can be arranged to each have a central axis opposite to and aligned with a central portion of an odd-numbered row pixel region. Also, the first pattern retarder 105a can be formed opposite to a lower portion of the pixel region adjacent to a top edge of the odd-numbered row pixel region and an upper portion of the pixel region adjacent to a bottom edge of the odd-numbered row pixel region.

Similarly, the second patterned retarders 105b can be also arranged to each have a central axis opposite to and aligned with a central portion of another odd-numbered row pixel region. Also, the second pattern retarder 105b can be formed opposite to a lower portion of the pixel region adjacent to a top edge of the odd-numbered row pixel region and an upper portion of the pixel region adjacent to a bottom edge of the odd-numbered row pixel region.

In other words, a boundary between the first patterned retarder 105a and the second patterned retarder 105b can be opposite to and aligned with a central portion of an even-numbered row pixel region.

For example, the second patterned retarder 105b can be formed opposite to a lower portion of a second row pixel region P2, a third row pixel region P3 and an upper portion of a fourth row pixel region P4. Similarly, the second patterned retarder 105a can be formed opposite to a lower portion of the fourth row pixel region P4, a fifth row pixel region P5 and an upper portion of a sixth row pixel region P6.

Also, a boundary between the bottom edge of the first patterned retarder 105a and the top edge of the second patterned retarder 105b can be opposite to and aligned with a central portion of a second row pixel region P2. Similarly, another boundary between the bottom edge of the second patterned retarder 105b and the top edge of the first patterned retarder 105a can be opposite to and aligned with a central portion of the fourth row pixel region P4.

In order to display a 3-D image through the 3-D image display device, the timing controller 110 modifies the video data RGB supplied from the display system. Also, the timing controller 110 supplies the modified video data R'G'B' to the data driver 130.

The timing controller 110 inserts black data DB into the video data RGB applied from the display system and supplies the modified video data R'G'B' with the inserted black data DB to the data driver 130. In detail, the timing controller 110 inserts the black data DB between horizontal lines of the video data RGB and generates the modified video data R'G'B' which will be applied to the data driver 130.

The data driver 130 converts the modified video data R'G'B' inserted with the black data DB into the data voltages. The data voltages are applied from the data driver 130 to the liquid crystal display panel 101.

Although the present embodiment discloses that the timing controller 110 inserts the black data DB into the video data RGB, the present disclosure is not limited to this. Alternatively, the data driver 130 can modify the video data applied from the timing controller 110 by inserting the black data DB between the horizontal lines of the video data RGB. In this case, the data driver 130 also converts the modified video data inserted with the black data DB into the data voltages which will be applied to the liquid crystal display panel 101.

Left image data DL and right image data DR can be applied alternately with each other to the odd-numbered row pixel regions of the liquid crystal display panel 101. Meanwhile, the black data DB can be applied to the even-numbered row pixel regions of the liquid crystal display panel 101. In other words, the black data DB can be displayed between the left image data DL and the right image data DR which is displayed on the liquid crystal display panel 101.

For example, as shown at 410 in FIG. 4, the left image data DL can be applied to the first row pixel regions P1, the black data DB can be applied to the second row pixel regions P2, and the right image data DR can be applied to the third row pixel regions P3. Also, the black data DB can be applied to the fourth row pixel regions P4 and the left image data DL can be applied to the fifth row pixel regions P5.

In this manner, the black data DB is inserted into the video data including the left image data and the right image data. As such, the viewing angle of the 3-D image display device can be enlarged. In detail, because the black data DB is inserted between the left image data DL and the right image data DR, crosstalk generated in the 3-D image due to interference between the left and right images can be reduced. In accordance therewith, the viewing angle of the 3-D image display device can be enhanced.

The quality of a 3-D image displayed by the 3-D image display device can be largely affected by the crosstalk. However, the 3-D image display device of the present disclosure can reduce the crosstalk. As such, the 3-D image display device of the present disclosure can enhance the quality of the 3-D image.

Also, the 3-D image display device of the first embodiment can display the 3-D image by inserting the black data DB without forming the black matrix in the pixel regions. When a 2-D image is displayed, the 3-D image display device can be driven without inserting the black data DB. In accordance therewith, a pixel aperture ratio can be maximized and display brightness can be increased.

Figure 6:
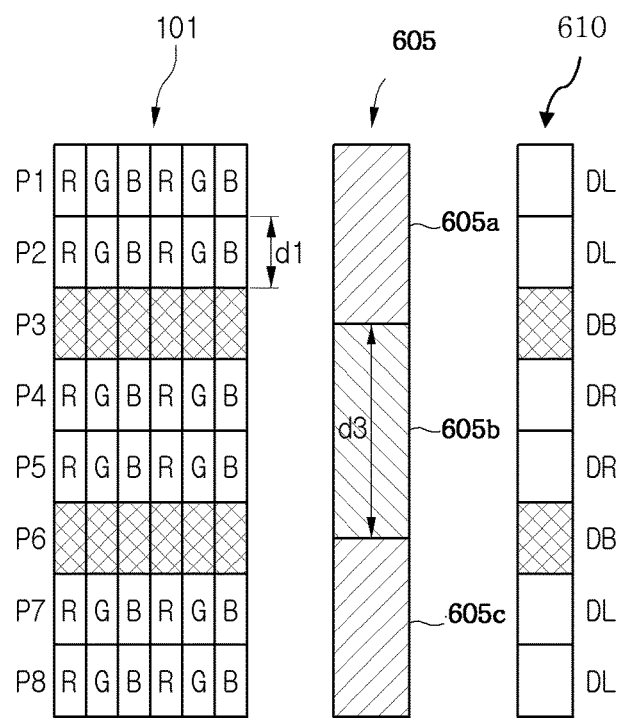
FIG. 6 is a block diagram illustrating a 3-D image display device according to a second exemplary embodiment of the present disclosure.
Figure 7:
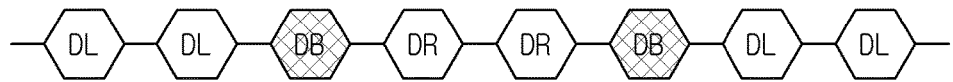
FIG. 7 is a waveform diagram illustrating data applied to a liquid crystal display panel of the 3-D image display device according to a second exemplary embodiment of the present disclosure.

FIG. 6 is a block diagram showing a 3-D image display device according to a second exemplary embodiment of the present disclosure. FIG. 7 is a waveform diagram illustrating data applied to a liquid crystal display panel of the 3-D image display device according to a second exemplary embodiment of the present disclosure.

The 3-D image display device of the second embodiment has a similar configuration as that of the first embodiment except that the first and second patterned retarders have different sizes from each other and the video data is modified. Components of the second embodiment having the same function and shape as those of the first embodiment will be referred to by the same reference numbers and names. Also, the description of the second embodiment overlapping with the first embodiment in the effect will be omitted.

Referring to FIGS. 6 and 7, the liquid crystal display panel 101 of the second embodiment can be defined into a plurality of pixel regions.

The patterned retarder 605 is disposed onto the front surface of the liquid crystal display panel 101. The patterned retarder 605 can include first patterned retarders 605aa and second patterned retarders 605b.

The first patterned retarder 605 a and the second patterned retarder 605 b can each have a third vertical height d3. The third vertical height d3 can be three times as big as the first vertical height d1. In other words, the first and second patterned retarders 605 a and 605 b can be each formed in a triple vertical height compared to that of the pixel region.

The left image data DL can be applied to the pixel regions on two consecutive rows of the liquid crystal display panel 101, and the right image data DR can be applied to the pixel regions on other two consecutive rows of the liquid crystal display panel 101. Also, the black data DB can be inserted between the left image data DL and the right image data DR. In detail, the black data DB can be applied to a single row of the pixel regions between two rows of the pixel regions receiving the left image data DL and other two rows of the pixel regions receiving the right image data DR.

In other words, the left image data DL and the right image data DR are each applied to the liquid crystal display panel 101 during two consecutive horizontal synchronous intervals. Meanwhile, the black data DB can be applied to the liquid crystal display panel 101 during a single horizontal synchronous interval between the left image data DL supply interval and the right image data DR supply interval.

Actually, the left image data DL can be applied to (3i−2)th and (3i−1)th rows of the liquid crystal display panel 101. The right image data DR can be applied to (3j−2)th and (3j−1)th rows of the liquid crystal display panel 101. The black data DB can be applied to (3k)th rows of the liquid crystal display panel 101. "i" is an odd-number smaller than "n", "j" is an even-number smaller than "n", and "k" is a natural number smaller than "n".

For example, as shown at 101 if FIG. 6, the left image data DL can be applied to the pixel regions on first and second rows P1 and P2 and the black data DB can be applied to the pixel regions on a third row P3. Also, the right image data DR can be applied to the pixel regions on fourth and fifth rows P4 and P5 and the black data DB can be applied to the pixel regions on a sixth row P6.

The central axis of the first patterned retarder 605a can be opposite to and aligned with a boundary between the two consecutive pixel region rows to which the left image data DL is applied. Also, the first patterned retarder 605a can be formed opposite to a lower portion of the pixel region adjacent to a top edge of an upper pixel region of the two consecutive rows receiving the left image data DL and an upper portion of the pixel region adjacent to a bottom edge of a lower pixel region of the two consecutive rows receiving the left image data DL.

Similarly, the central axis of the second patterned retarder 605b can be opposite to and aligned with a boundary between the two consecutive pixel region rows to which the right image data DR is applied. Also, the second patterned retarder 605b can be formed opposite to a lower portion of the pixel region adjacent to a top edge of an upper pixel region of the two consecutive rows receiving the right image data DR and an upper portion of the pixel region adjacent to a bottom edge of a lower pixel region of the two consecutive rows receiving the right image data DR.

Meanwhile, a boundary between the first and second patterned retarder 605a and 605b can be opposite to and aligned with a single pixel region row to which the black data DB is applied.

For example, the second patterned retarder 605b can be formed opposite to the lower portion of the third row pixel region P3, the fourth row pixel region P4, the fifth row pixel region P5 and the upper portion of the sixth row pixel region P6. The first patterned retarder 605a can be formed opposite to the lower portion of the sixth row pixel region P6, the seventh row pixel region P7, the eighth row pixel region P8 and the upper portion of the ninth row pixel region P9.

In this way, the 3-D image display device of the second embodiment enables not only the left image data and the right image data to be each applied during two consecutive horizontal synchronous intervals but also the first and second patterned retarders 605a and 605b to be formed in a large pitch (or in a large vertical height). As such, the pixel regions used to display the left and right images can have an enlarged pitch (or an enlarged vertical height). In accordance therewith, the difference between upward and downward viewing angles can be prevented or minimized though misalignment of the liquid crystal display panel 101 and the patterned retarder 605.

Also, each of the left image data DL and the right image data DR is each applied during the two consecutive horizontal intervals and the black data DB is applied during a single horizontal synchronous interval. Therefore, a pixel aperture ratio can be maximized and, furthermore, the image display device brightness can be increased.

As described above, the present disclosure allows the black data DB to be inserted into the video data including the left image data DL and the right image data DR. As such, the viewing angle of the 3-D image display device can be increased. In detail, because the black data DB is inserted between the left image data DL and the right image data DR, crosstalk generated in the 3-D image due to interference between the left and right images can be reduced. In accordance therewith, the viewing angle of the 3-D image display device can be enhanced.

The quality of a 3-D image displayed by the 3-D image display device can be largely affected by crosstalk. However, the 3-D image display device of the present disclosure can reduce the crosstalk. As such, the 3-D image display device of the present disclosure can enhance the quality of the 3-D image.

Moreover, the 3-D image display device of the embodiments can display the 3-D image by inserting the black data DB without forming the black matrix in the pixel regions. When a 2-D image is displayed, the 3-D image display device can be driven without inserting the black data DB. In accordance therewith, pixel aperture ratio can be maximized and device brightness can be increased.

Although the present disclosure has been explained regarding the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A three-dimensional image display device comprising:
   a liquid crystal display panel having a plurality of pixel regions, each pixel region comprising subpixels of different colors disposed adjacent to one another in a first direction, wherein subpixels of a same color are arranged along a second direction perpendicular to the first direction;
   a data driver configured to supply data voltages to the pixel regions, wherein the data driver supplies pixel regions in the first direction with one of data voltages corresponding to left image data, right image data, and black data wherein the black data is inserted between the left image data and the right image data; and
   a patterned retarder disposed on a front surface of the liquid crystal display panel to polarize light from the liquid crystal display panel,
   wherein the patterned retarder includes a first patterned retarder, configured to circularly polarize light from the liquid crystal display panel in a first direction and is formed in a height greater than that of a pixel region of the plurality of pixel regions, and a second patterned retarder to circularly polarize light from the liquid crystal display panel in a second direction opposite the first direction and is formed in a height greater than that of the pixel region,
   wherein a boundary between the first and the second patterned retarders is aligned with pixel regions in a row receiving the black data,
   wherein the left image data and the right image data are each supplied during two consecutive horizontal synchronous intervals, and
   wherein the black data is supplied during a single horizontal synchronous interval between the left image data and the right image data.

2. The three-dimensional image display device of claim 1, wherein the first and the second patterned retarders are formed to have about triple a height of the pixel region.

3. The three-dimensional image display device of claim 1, wherein the first and second patterned retarders have different sizes from each other.

* * * * *